(12) United States Patent
Bohach et al.

(10) Patent No.: US 7,566,497 B2
(45) Date of Patent: *Jul. 28, 2009

(54) METHOD FOR FORMING PIGMENT PSEUDOPARTICLES

(75) Inventors: William L. Bohach, Savannah, GA (US); Christopher S. Bohach, Savannah, GA (US)

(73) Assignee: Manufacturing and Process Technologies, L.L.C., Savannah, GA (US)

( * ) Notice: Subject to any disclaimer, the term of this patent is extended or adjusted under 35 U.S.C. 154(b) by 824 days.

This patent is subject to a terminal disclaimer.

(21) Appl. No.: 10/787,371

(22) Filed: Feb. 26, 2004

(65) Prior Publication Data

US 2005/0202243 A1    Sep. 15, 2005

Related U.S. Application Data

(63) Continuation-in-part of application No. 10/407,334, filed on Apr. 7, 2003, now Pat. No. 6,908,675.

(60) Provisional application No. 60/375,115, filed on Apr. 22, 2002.

(51) Int. Cl.
B32B 5/16    (2006.01)

(52) U.S. Cl. .................. 428/402; 428/403; 428/404; 428/405; 428/406; 428/407; 427/212; 106/436

(58) Field of Classification Search ........ 429/402–407; 427/212; 106/436
See application file for complete search history.

(56) References Cited

U.S. PATENT DOCUMENTS

| | | | |
|---|---|---|---|
| 3,660,129 A * | 5/1972 | Luginsland | 106/447 |
| 3,925,095 A | 12/1975 | Bockmann et al. | |
| 4,056,402 A | 11/1977 | Guzi, Jr. | |
| 4,127,421 A | 11/1978 | Ferrill, Jr. | |
| 4,285,994 A | 8/1981 | Pearce et al. | |
| 4,310,483 A * | 1/1982 | Dorfel et al. | 264/117 |
| 4,375,520 A | 3/1983 | Pennie et al. | |
| 4,464,203 A | 8/1984 | Belde et al. | |
| 4,762,523 A | 8/1988 | Gawol et al. | |
| 4,810,305 A | 3/1989 | Braun et al. | |
| 5,035,748 A | 7/1991 | Burow et al. | |
| 5,199,986 A * | 4/1993 | Krockert et al. | 106/712 |
| 5,604,279 A | 2/1997 | Bernhardt et al. | |
| 5,733,365 A | 3/1998 | Halko et al. | |
| 5,908,498 A | 6/1999 | Kauffman et al. | |
| 6,132,505 A * | 10/2000 | Linde et al. | 106/429 |
| 6,908,675 B1 * | 6/2005 | Bohach et al. | 428/402 |
| 2003/0178598 A1 | 9/2003 | Reeves et al. | |

FOREIGN PATENT DOCUMENTS

WO    WO 02/096549 A1    12/2002

OTHER PUBLICATIONS

WWW.SPHERIFORM.COM, Spheriform PTY Ltd., Pelletising and Agglomeration Technologies for Sustainable Development, Sep. 2002, 9 pp.
Wolfgang Pietsch, Mixers for Growth-Tumble Agglomeration, Powder and Bulk Engineering, Feb. 2003, pp.
International Search Report for PCT/US2005/019758 (mailed Aug. 24, 2006).
Written Opinion for PCT/US2005/019758 (mailed Aug. 24, 2006).
Wolfgang Pietsch Mixers for Growth-Tumble Agglomeration Bulk and Powder Engineering (Magazine) Dec. 2002 www.powderbulk.com.
Peter M. Koenig Agglomeration Methods & Equipment Hosokawa Bepex 333 N.E. Taft St Minneapolis, MN 55413, 1998.
Perry, R.H.; Green, D. Perry's Chemical Engineer's Handbook 7th Edition Sec 20, McGraw-Hill 1999.

* cited by examiner

*Primary Examiner*—Leszek Kiliman
(74) *Attorney, Agent, or Firm*—McCarter & English, LLP

(57)    ABSTRACT

Disclosed herein is a method of forming pigment pseudoparticles from pigment particles, comprising polarizing the pigment particles with a gas and agglomerating the polarized pigment particles to form pigment pseudoparticles. Also disclosed herein is a pigment pseudoparticle comprising pigment particles bonded together primarily by an induced level of intermolecular electrostatic attractive force, wherein the pseudoparticle is substantially free of internal dust. Furthermore, an apparatus is disclosed herein for creating pigment pseudoparticles from pigment particles, the apparatus comprising a hollow vessel having an inner cylindrical surface, a plurality of scoops extending inwardly from the inner surface and positioned along the axial length of the hollow vessel and means for passing pigment particles through the gas. Additional embodiments of the invention are disclosed herein.

53 Claims, 6 Drawing Sheets

METHOD FOR FORMING PIGMENT PSEUDOPARTICLES

CROSS-REFERENCE TO RELATED APPLICATIONS

The present application is a continuation-in-part of U.S. application Ser. No. 10/407,334 filed Apr. 7, 2003, which claims the benefit of U.S. Provisional Application No. 60/375,115 filed Apr. 22, 2002, each of which is hereby incorporated by reference in its entirety for all purposes.

BACKGROUND OF THE INVENTION

The invention disclosed herein relates generally to an apparatus and method of forming pigment pseudoparticles from pigment particles, as well as the pigment pseudoparticles produced therefrom. More specifically, embodiments of the disclosed invention relate to polarizing pigment particles and agglomerating the polarized pigment particles to form pigment pseudoparticles.

Titanium dioxide pigment particles, iron oxides pigment particles, pearlescent pigment particles, other metal oxide pigment particles, are often used in cosmetics, detergents, paint, plastics, and other products and industries where it is desired to add to the color of the product and/or opacify the desired product. This is usually done through intensive mixing of pigment pellets and/or powder in a liquid medium to be colored. Some desired properties for the pigment pellets are the dispersability of the pigment throughout the application system, ease of bulk handling, ease of metering and the amount of dust tainting the pigment pellet.

To enhance dispersability in a medium to be colored, pigment is often produced in the form of a finely divided powder of preferably inorganic pigment particles. The powders are usually jet-milled, sand milled, hammer milled or roller milled as a finishing step in their production, which contributes to dispersability and gloss. However, milled pigments in the art generally exhibit poor dry flow characteristics and have the great disadvantage of being extremely dusty. During use of these powders, costly measures must be taken to reduce the harmful effects of the dust (e.g. workplace safety, ecological concerns, product quality assurance, etc.), thus consuming valuable time, money and other resources. Furthermore, pellets made from such powders are general difficult to handle, storing, transport and introduce into the manufacturing equipment without the pellets crumbling. Thus, products that have achieved good pigment dispersability often fail to provide good pigment stability and products that have achieved good pigment stability often fail to provide good pigment dispersability.

Processes of the prior art attempted to solve some of these problems by using chemical additives. For example, U.S. Pat. No. 4,285,994 ("Pearce") discusses a process for production for free flowing dust-free pigments, a process comprising tumbling together a finely divided wax composition a powdered pigment so that the wax absorbs the pigment, and a nucleated pigment comprising a spray-chilled wax composition. Also, U.S. Pat. No. 4,375,520 ("Pennie") discusses treatment of particles with a solid low-molecular weight polymer and a liquid polymer substance.

Other problems repeatedly experienced in handling large quantities of powders are caking, rat holing and bridging. The stability of pigment is important for good storage and transporting, and it is desired to avert aging and/or pigment clumping into undesired agglomerates when stored pigment is subjected to heat, humidity and pressure over time. Together with dust-related problems associated with finely divided powders, it is frequently desired that pigment particles are formed into pigment pellets. However, pigment pellets must also be formed so that they are easily dispersible in a medium and so the pellets do not clog feed bines, which causes reduced pigment flow and other problems.

Solutions to some of these problems have been attempted in the prior art. For example, U.S. Pat. No. 5,604,279 ("Bernhardt") discusses a colorant composition consisting essentially of a free flow agent with one or more colorants finely dispersed in an amorphous poly-.alpha.-olefin which is composed of at least two different monomers having a butene-1 content of at least 25% by weight. U.S. Pat. No. 5,199,986 ("Krockert") discusses a process for coloring building materials with inorganic pigments which comprises incorporating into said materials pigments in the form of granulates which are free-flowing and no dust forming wherein the pigment granulates are produced from spray dried granules by after-granulating.

Dispersability is a measure of the ease with which the pigment can be uniformly and homogenously mixed into a medium, and poor dispersion in the medium can cause large agglomerates that may result in lumps, surface imperfections, color streaks, non-uniform coloration, and/or incomplete color development within the medium. Methods of the prior art have attempted to enhance dispersability or to improve dry flow characteristics by surface treatment of pigments to achieve improved performance characteristics for when the pigment is dispersed in, for example, coatings and/or plastic compositions. For example, U.S. Pat. No. 3,925,095 ("Bockmann") discusses a dispersible composition comprising an inorganic pigment or filler and a hydroxyalkylated alkylene diamine, while U.S. Pat. No. 4,056,402 ("Guzi") discusses a pigment composition prepared by milling the pigment in water in the presence of a nonionic dispersing agent, mixing the milled pigment dispersion with a cellulose ether, and removing the water from the resulting mixture.

U.S. Pat. No. 4,310,483 ("Dorfel") discusses a process for producing a granulate by thermal tumbling granulation utilizing an additive and a granulating auxiliary, and U.S. Pat. No. 4,464,203 discusses concentrated pigment formulations containing pigments and ethylene oxide. Pigments have also been treated with waxes, aqueous solutions, polymers, etc. For example, U.S. Pat. No. 4,127,421 ("Ferrill") discusses the forming of an aqueous slurry of a lead chromate-containing pigment dispersed in a friable hydrocarbon resin. Also, U.S. Pat. No. 4,762,523 discusses mixing a long-chain polyester surfactant produced by condensation and adding an essentially non-volatile liquid selected from the group consisting of mineral oil and molten wax.

Another method for making free-flowing powders with low dust can be obtained by spray drying. These products generally exhibit poor coloring properties and end users have thus generally had to choose between free-flowing, low dusting, spray-dried pigments with poor coloring properties, and dusty, milled pigments with poor flow characteristics For example, U.S. Pat. No. 3,660,129 ("Luginsland") discusses coating titanium oxide pigments with hydrous oxides and sanding and drying the pigment. This results in small particle size with a high proportion of fine particles that are not directly usable pellets. Also, this hydrophobic spray-drying post-treatment results in particles that have somewhat good flow properties but produce exceptionally large quantities of dust.

Other patents relating to spray drying include the Krockert patent discussed above, as well as U.S. Pat. No. 4,810,305 ("Braun") and U.S. Pat. No. 5,035,748 ("Burrow"), which both discuss the use of organosiloxanes. Furthermore, U.S. Pat. No. 5,733,365 ("Halko") discusses the aqueous milling, surface treatment, and spray-drying of inorganic pigments, U.S. Pat. No. 6,132,505 discusses spray drying and agglomeration, and U.S. Pat. No. 5,908,498 ("Kauffman") discusses forming a dispersed slurry of pigment and water, milling the slurry and depositing a treating agent on the slurried milled pigment.

Each of the methods and products of the prior art are deficient in at least one of the characteristics desired of pigment, as the quality of the other characteristics increases. The prior art fails to solve the problem of forming a pigment pellet that simultaneously possesses the qualities of being extremely friable, highly dispersible, smoothly discharging, able to alleviate bridging and rat holing, substantially free of dust, easily metered, highly dense and resistant to compaction.

Pigment particles, such as titanium dioxide for example, generally have detrimental clumping properties due to the high cohesive nature of the pigment, the particles tightly clumping and caking during movement in transit, in storage. In use however, titanium dioxide forms fine powders or dusts which spread in the air, and which further stick to the surrounding areas. Any reduction in dust has serious health benefits and as well as other benefits relating to the concerns of the National Institute of Occupational Safety and Health (NIOSH), the Department of Labor and/or the Environmental Protection Agency. There can also be loss of optical properties when these clumps are incorporated into powder coatings and plastics applications.

Overcoming the disadvantages present in the prior art, embodiments of the invention disclosed herein utilize electrostatics to induce an attractive bonding force between the pigment particles. Embodiments of the disclosed invention possess the desired pigmenting characteristics without the inclusion of additives and without dry spraying being required.

SUMMARY OF THE INVENTION

Disclosed herein is a method of forming pigment pseudoparticles from pigment particles. The method includes polarizing the pigment particles with a gas or gases and agglomerating the polarized pigment particles to form pigment pseudoparticles. In preferred embodiments, the term "agglomerating" is used herein to refer to the process of particle size enlargement. Small fine particles are gathered into clusters of particles for use as end product, wherein the clusters are preferably substantially spherical in shape. The term "pigment pseudoparticle" is used herein to refer to friable clusters of pigment particles, and pigment pseudoparticles are characterized as having a density greater than the collection of unagglomerated pigment particles (e.g. the powder). A pigment pseudoparticle is similar to a traditional pellet in the respect that both are comprised of a plurality of particles.

The pigment particles preferably comprise titanium dioxide particles, however a pigment particle comprises any suitable particle, including by nonlimiting example, suitable metal oxides particles. In preferred embodiments of the invention, "pigment particles" are particulate in nature, non-volatile in use, and/or typically referred to as inerts, fillers, extenders, etc.

The terms "polarizing", "polarized", etc. generally refers to a shift in the magnitudes and/or spatial positioning of the molecular (and/or particulate) charge densities, thereby creating both (1) a more negatively charged portion of the molecule (and/or particle) and (2) a more positively charged portion of the molecule (and/or particle). In preferred embodiments, a polarized pigment particle has a shift in charge great enough to increase van der Waal bonding between the molecules of the pigment particles. In some aspects, polarizing the pigment particles includes inducing an at least temporary dipole in each of the pigment particles. In some aspects, polarizing the pigment particles comprises polarizing less than all molecules of the pigment particles. In some embodiments, the pigment particles become charged, preferably by stripping electrons from the gas.

The method preferably includes passing pigment particles through a flow of a gas within a hollow vessel. In preferred embodiments, the flow also carries excess heat away from the pigment particles after passing between them. Preferably, the characteristics of the flow are such that the flow will carry away no more than a negligible amount of pigment particles.

In some embodiments, agglomerating the polarized pigment particles to form pigment pseudoparticles comprises depositing a portion of the polarized pigment particles upon a pile of the polarized pigment particle, the pile having an angle of inclination greater than the angle of repose of the pile. An "angle of repose" refers to the maximum angle of inclination of a plane at which a pigment particle placed on the plane would remain at rest. In some embodiments, the pigment particles are agglomerated into substantially-spherical shapes, where each shape preferably has a diameter between about 0.1 millimeter and about 5.0 millimeters. Agglomerating the pigment particles preferably comprises nucleating the pigment particles. In some aspects, impact consolidation occurs when the particles land after falling through the gas.

In some embodiments, the pigment particles are deaerated. The pigment particles are preferably agglomerated by axially rotating a hollow vessel having an inner cylindrical surface containing the polarized pigment particles, thereby inducing repeated avalanching of the polarized particles. In some aspects, the inlet feed of the hollow vessel is vibrated to deaerate the pigment particles, wherein the vibrations are preferably at a frequency between about sixty vibrations per minute and about twenty-thousand vibrations per minute.

The method of forming pigment pseudoparticles from pigment particles is preferably repeatedly conducted under an electrically isolated condition, at temperatures between about 0 degrees Celsius and about 100 degrees Celsius and for a duration of time between about 0.25 minutes and about 15 minutes. In some embodiments, the pigment pseudoparticles are post-treated, such as for example, by applying a layer of chemical additive to the surface of the pigment pseudoparticles. Embodiments of the invention comprise the pigment pseudoparticles produced in accordance with the method of forming pigment pseudoparticles from pigment particles, paint formulations comprising the pigment pseudoparticles and/or masterbatch comprising the pigment pseudoparticles.

Also disclosed herein is a method of forming pigment pseudoparticles from titanium dioxide particles. The method includes passing a flow of pigment particles through a gas within a hollow vessel, thereby inducing an attractive electrostatic force between the pigment particles. The method also includes axially rotating the hollow vessel as flowing occurs, thereby inducing a repeated avalanching of polarized pigment particles that, together with the electrostatic force, agglomerates the charged pigment particles into pigment pseudoparticles. The method preferably comprises axially rotating the hollow vessel as flowing occurs, thereby inducing a scoop attached to an inner surface of the hollow tube to scoop a portion of the pigment particles, axially carry the portion, and dispense the portion into the flow. The method also preferably comprises vibrating the inlet feed of the hollow vessel to deaerate the pigment particles. In some aspects, embodiments of the invention include the pigment pseudoparticles produced in accordance with the method.

Preferred embodiments of the invention include a pigment pseudoparticle comprising pigment particles bonded together primarily by an induced level of intermolecular electrostatic attractive force, wherein the pigment pseudoparticle is substantially free of internal dust. Other embodiments include a pigment pseudoparticle consisting essentially of pigment particles bonded together by an induced level of intermolecular electrostatic attractive force. In some embodiments, the invention includes a post-treated pigment pseudoparticle, comprising a pigment pseudoparticle consisting essentially of pigment particles bonded together by an induced level of intermolecular electrostatic attractive force, wherein at least part of a surface of the pigment pseudoparticle is post-treated with chemicals.

Disclosed herein is also method of creating pigment pseudoparticles from pigment particles, comprising providing an inclined hollow vessel having a cylindrical inner surface, a higher inlet end and a lower outlet end and providing a plurality of scoops extending inwardly from the cylindrical inner surface and positioned along the axial length of the inclined hollow vessel. In preferred embodiments, the pigment particles are positioned on a portion of the cylindrical inner surface near the inlet end and a flow of gas or gases are passed through the inclined hollow vessel in a direction toward the lower outlet end. The inclined hollow vessel is rotated to scoop the pigment particles with the scoop, and the pigment particles are dispensed from the scoop by axially rotating the inclined hollow vessel, thereby allowing the pigment particles to fall towards a portion of the cylindrical inner surface nearer the inner surface while being polarized by the gas. The inclined hollow vessel is also axially rotated to avalanche the pigment particles, thereby agglomerating the pigment particles into pigment pseudoparticles.

The invention preferably includes an apparatus for creating pigment pseudoparticles from pigment particles, comprising means for polarizing the pigment particles and means for agglomerating the polarized pigment particles into pigment pseudoparticles. The apparatus also preferably includes means for deaerating the pigment particles.

Disclosed herein is also an apparatus for creating pigment pseudoparticles from pigment particles, comprising a hollow vessel, a plurality of scoops and blowing means. The hollow vessel preferably has an inner cylindrical surface, an inlet end and an outlet end, and is adapted to be positioned in an inclined position having the inlet end higher and the outlet end lower. The plurality of scoops extend inwardly from the inner surface and are positioned along the axial length of the hollow vessel, and the blowing means is used to for passing a flow of gas through the hollow vessel in a direction toward the outlet end. Preferred embodiments of the apparatus also include vibrating means for vibrating the hollow vessel, thereby deaerating the pigment particles. The apparatus preferably includes means for minimizing adhesion between the inner cylindrical surface and at least one of the pigment particles and the polarized pigment particles.

There are many benefits to agglomerating polarized pigment particles into pigment pseudoparticles. By way of non-limiting example, these benefits include increased bulk density, decreased packaging size and requirements, improved flow, reduced lumping and caking, increased control of flow rate, reduced dusting, composition uniformity, consistent size and shape, easy metering, increased dispersability (even after exposure during storage to high temperatures and humidity), consistent product performance and decreased internal and surface dust.

These and other features and objects of the invention will be more fully understood from the following detailed description of the preferred embodiments, which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention. In the drawings:

FIG. 5b is a front side view drawing showing the embodiment of the paddle shown in FIG. 5a.

DETAILED DESCRIPTION OF THE INVENTION

Figure 1:
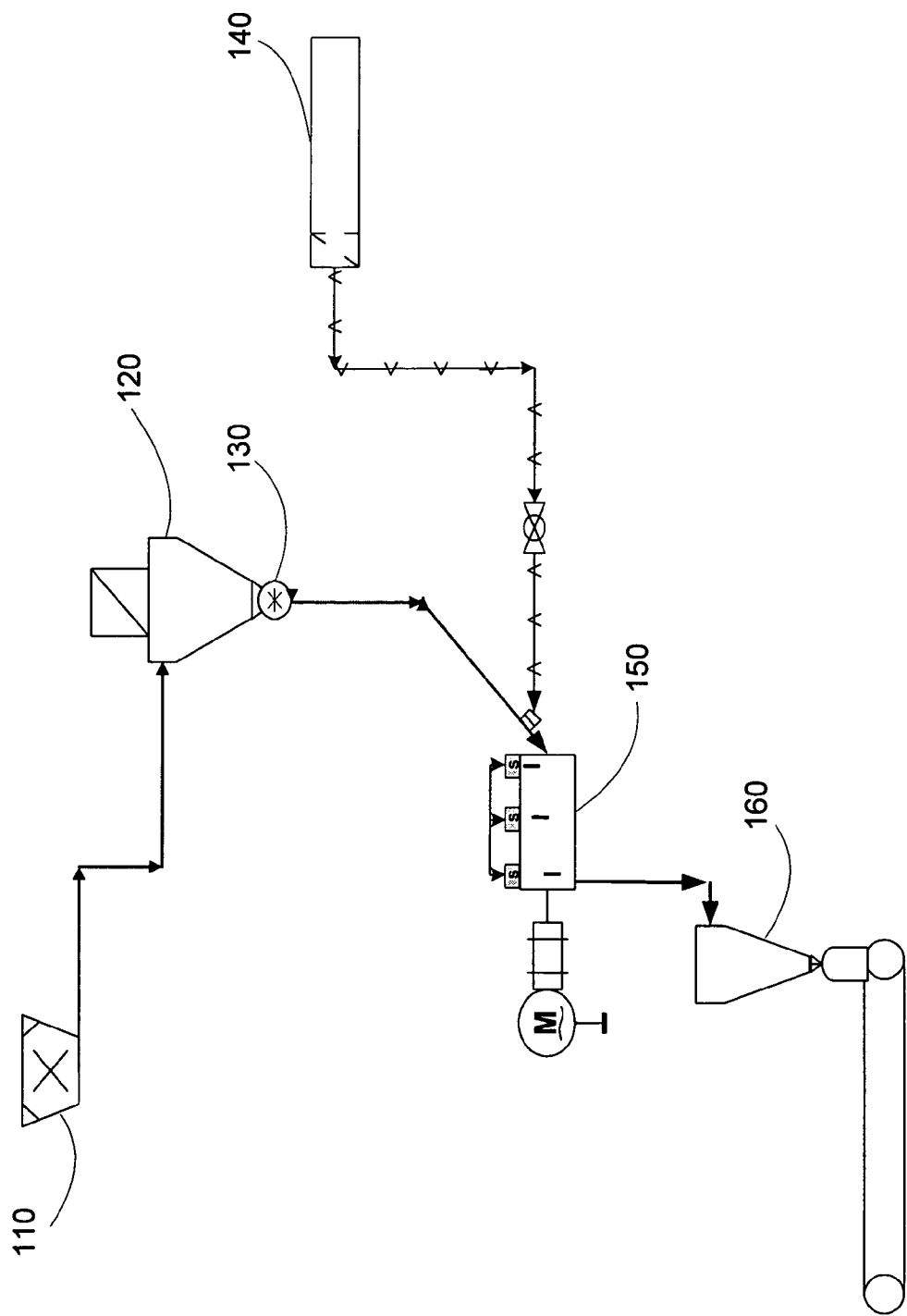
FIG. 1 is a flow diagram showing an embodiment of a process utilizing a rotary cylinder agglomerator.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

The preferred processing unit, herein referred to as a rotary cylinder agglomerator and designated generally 150, is designed to agglomerate powdered titanium dioxide particles in the presence of small natural draft airflow having electrostatic charge. The rotary cylinder agglomerator harnesses attractive van der Waal forces to preferably agglomerate all titanium dioxide particles into pseudoparticles that are preferably characterized as being spherical ersatz particles.

To better understand the preferred chain of manufacturer and with principal reference to FIG. 1, an embodiment of a sample manufacturing process is shown utilizing rotary cylinder agglomerator 150. A grinding machine 110 is used to form a powder comprising the pigment particles (e.g. the titanium dioxide particles), which are then stored in feed bin 120. The pigment particles can then be fed into rotary cylinder agglomerator 150 by engaging feed valve 130, which maintains the desired feed rate.

Rotary cylinder agglomerator 150, which is discussed below in further detail, agglomerates the fed pigment particles into larger pseudoparticles bound together by using attractive van der Waal forces. Mechanical binding (e.g. compression) and/or chemical binding (e.g. additives) can be used, but are not required. Part of the agglomeration process discussed below is the vibration of the feed inlet of rotary cylinder agglomerator 150 to deaerate the pigment particles. To this end, a compressor 140 feeds dry air to the feed inlet of rotary cylinder agglomerator 150 to operate the vibration mechanisms that deaerate the pigment particles on rotary cylinder agglomerator 150 and/or inlet feed 205. After the pigment particles are agglomerated into pigment pseudoparticles, the pigment pseudoparticles are conveyed to packing bin 160 where the pigment pseudoparticles are packaged for transportation.

Figure 2:
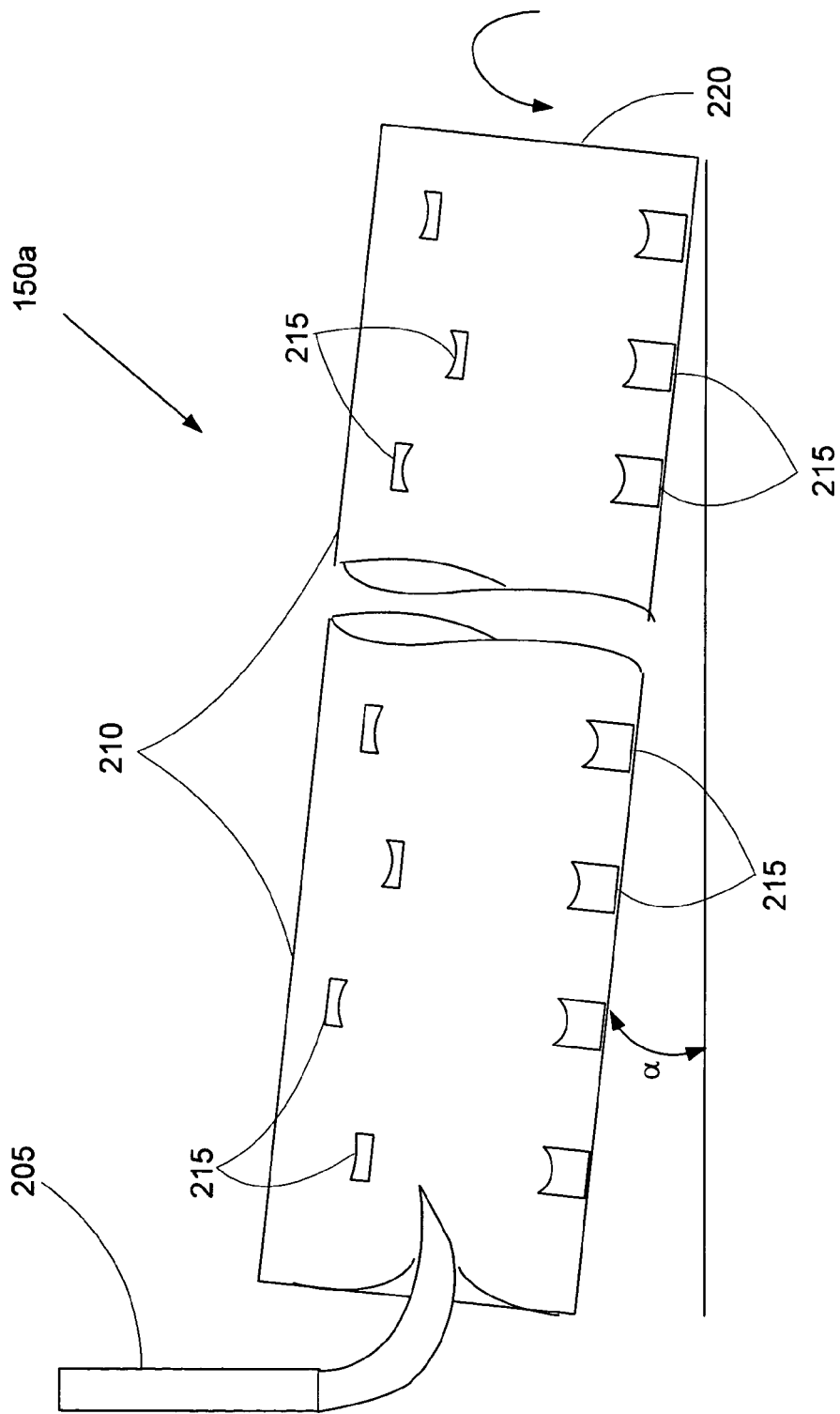
FIG. 2 is a cross-sectional right side view drawing showing an embodiment of the rotary cylinder agglomerator.

With principal reference to FIG. 2, a sample embodiment of a rotary cylinder agglomerator is shown and designated generally 150a. Inlet feed 205 delivers pigment particles from feed bin 120 at a rate controlled by feed valve 130. Rotary cylinder agglomerator 150a comprises a hollow inclined hollow vessel 210 for accepting the pigment particles from inlet feed 205 and that rotates along its central axis. Rotary cylinder agglomerator 150a is preferably inclined at angle of inclination α, which is preferably less than twenty degrees from the horizontal. The inner surface of hollow inclined hollow vessel 210 contains ledges 215. Thus, when the pigment particles are fed into hollow inclined hollow vessel 210, the rotation causes ledges 215 to lift portions of the pigment particle. As hollow inclined hollow vessel 210 continues to rotate, the pigment particles are dispensed from the ledges as a natural result of gravity and fall through the air landing on other pigment particles.

As shown, the ledges have concave curvatures, which increases the efficiency of scooping the pigment particles, as well as increasing the degree to which the pigment is dispersed upon being dispensed from the ledges. The air polarizes the pigment particles and the polarized pigment particles are agglomerated by the further rotation of hollow inclined hollow vessel 210 to form pigment pseudoparticles, such as for example, pigment pellets. The pseudoparticles exit from the outlet 220 of hollow inclined hollow vessel 210.

Figure 3:
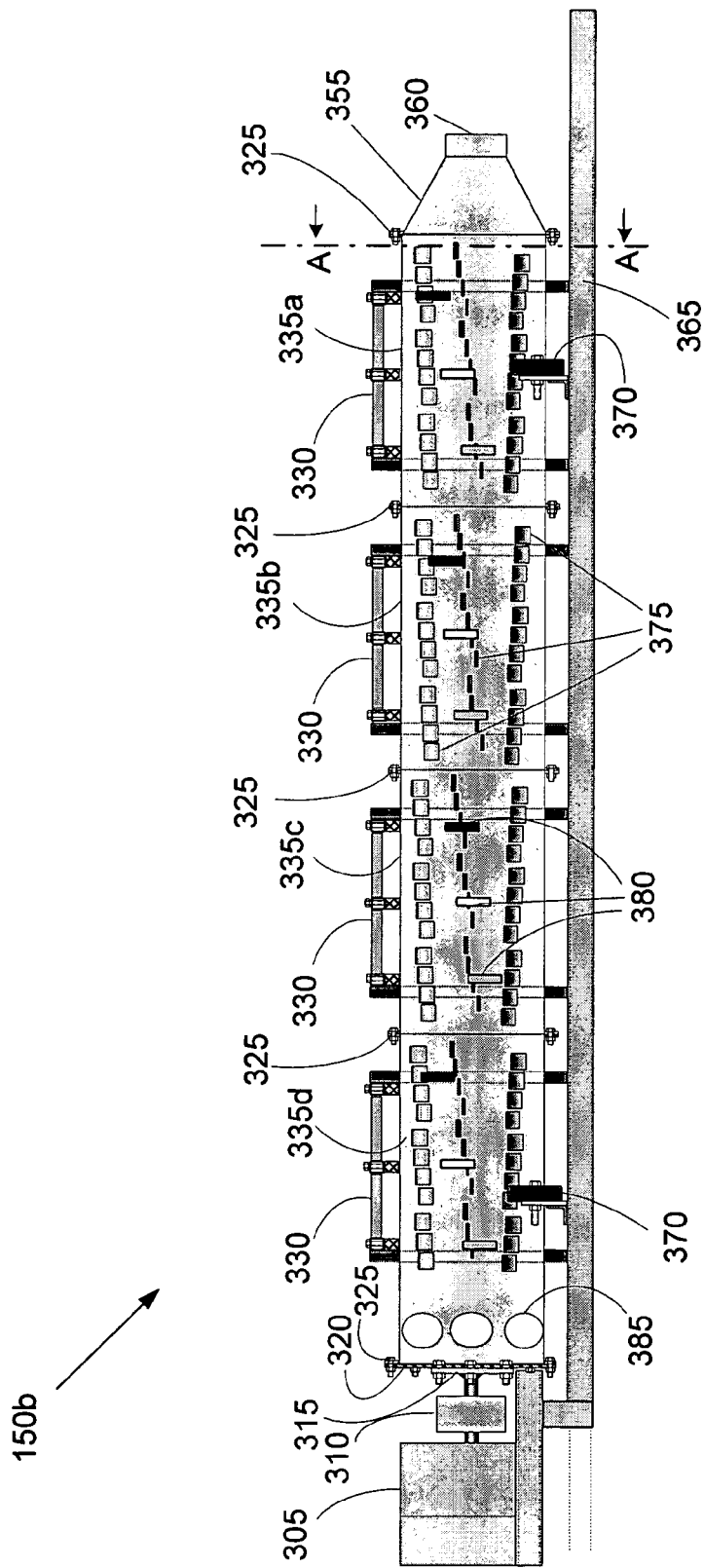
FIG. 3 is cross-sectional left side view drawing showing another embodiment of the rotary cylinder agglomerator.

With principal reference to FIG. 3 through FIG. 5, another sample embodiment of a rotary cylinder agglomerator is designated generally 150b and shall now be discussed in detail. Methods of using embodiments of rotary cylinder agglomerator 150 will primarily be discussed with principle reference to FIG. 6.

With principal reference to FIG. 3, rotary cylinder agglomerator 150b includes a hollow vessel, which preferably has an inner cylindrical surface and more preferably has an overall cylindrical shape. The hollow vessel is designated generally as 335 and can be of unitary or modular design and of any suitable length. However hollow vessel 335 is preferably modular and is shown as including four zone processing tubes, referenced herein as a first zone processing tube 335a, a second zone processing tube 335b, a third zone processing tube 335c and a fourth zone processing tube 335d. Hollow vessel 335 is capable of rotation along its central longitudinal axis. The processing tubes are preferably attached to each other with flanges 325.

Rotary cylinder agglomerator 150b has a feed inlet 360 and feed cone 355 on an end for receiving pigment particles from feed bin 120 into first zone processing tube 335a. Rotary cylinder agglomerator 150b has discharge ports 385 on the other end for discharging the pigment pseudoparticles from fourth zone processing tube 335d. Hollow vessel 335 is preferably angled with respect to the horizontal (not shown in FIG. 3 through FIG. 5). The angle of inclination of hollow vessel 335 is preferably equal to up to about ten degrees and more preferably about seven degrees. When inclined, the end having feed inlet 360 and feed cone 360 is higher than the end having discharge ports 385. The angle of inclination can be varied to enhance conveyance of the pigment particles through rotary cylinder agglomerator 150b or to increase retention time in rotary cylinder agglomerator 150b.

Continuing with principal reference to FIG. 3, the hollow vessel of rotary cylinder agglomerator 150b is connected to drive means 305, which is preferably a variable speed gear reducer drive, thereby encouraging rotation of hollow vessel 335. Drive means 305 drives the rotation of hollow vessel via coupling means 310, which is preferably a flexible drive coupling. In preferred embodiments, drive means 305 is operably connected to fourth zone processing tube 335d via a drive plates 315 and 320, and flange 325. Rotary cylinder agglomerator 150b preferably comprises frame 365, which supports hollow vessel 335 on trunnions 370 for ease of rotary movement of the hollow vessel. Strikers 330 are also attached to hollow vessel 335 for causing vibrations. This assists in minimizing any adhesion between the inner cylindrical surface and at least one of the pigment particles and the polarized pigment particles. To the extent, if any, that the pigment particles are sticking to the inner cylindrical surface, the vibrations caused by the strikers helps prevent the particles from sticking to the inner cylindrical surface.

Figures 4A, 4B:
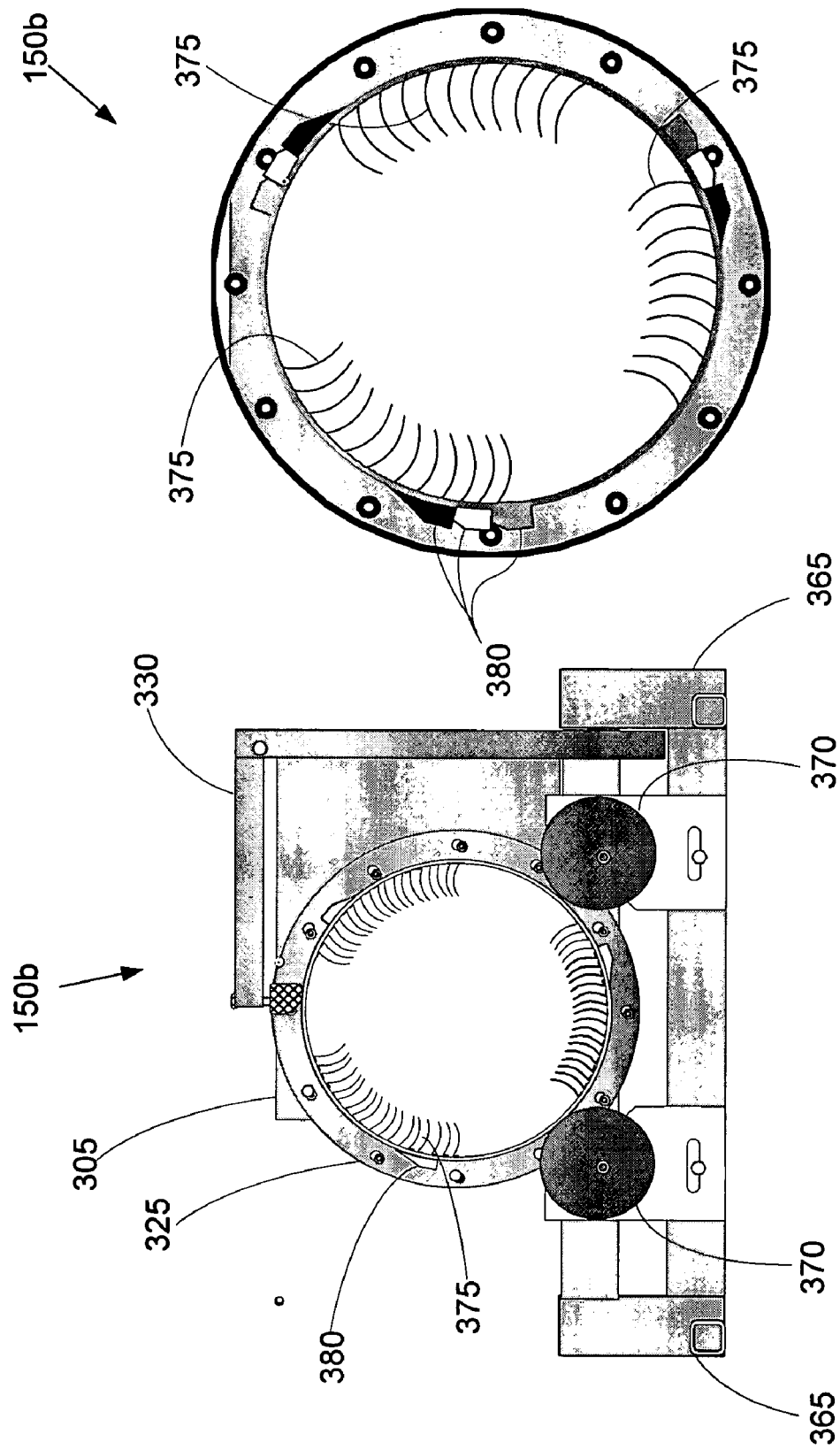
FIG. 4a is a cross-sectional front side view drawing showing the embodiment of the rotary cylinder agglomerator of FIG. 3 taken along line A-A.
FIG. 4b is an expanded cross-sectional front side view drawing showing the embodiment of the rotary cylinder agglomerator of FIG. 3 taken along line A-A.

With principal reference to FIG. 4a and FIG. 4b, the internal structure of hollow vessel 335 preferably contains a plurality of paddles 375. Each of paddles 375 extends inward from the inner cylindrical surface and are preferably grouped together in sets (three sets of paddles 375 are shown in the drawings). Each set of paddles 375 is preferably positioned along the inner cylindrical surface in a substantially helical formation. The internal structure of hollow vessel 335 preferably also contains lifters 380 for actuating strikers 330. The lifters 380 are triggered by the rotation of hollow vessel 335 and are staggered in intervals about the circumference of hollow vessel 335. Thus, the striking action is continuous (so long as rotation is continuous) and periodic (in accordance with the intervals between the lifters). Lifters 380 and strikers 330 are preferably pneumatic, operating from the dry air fed by a compressor, preferably from compressor 140 (shown in FIG. 1) that also feeds dry air to feed inlet 205 of rotary cylinder agglomerator 150 to operate the vibration mechanisms that deaerate the pigment particles.

Figure 5B:
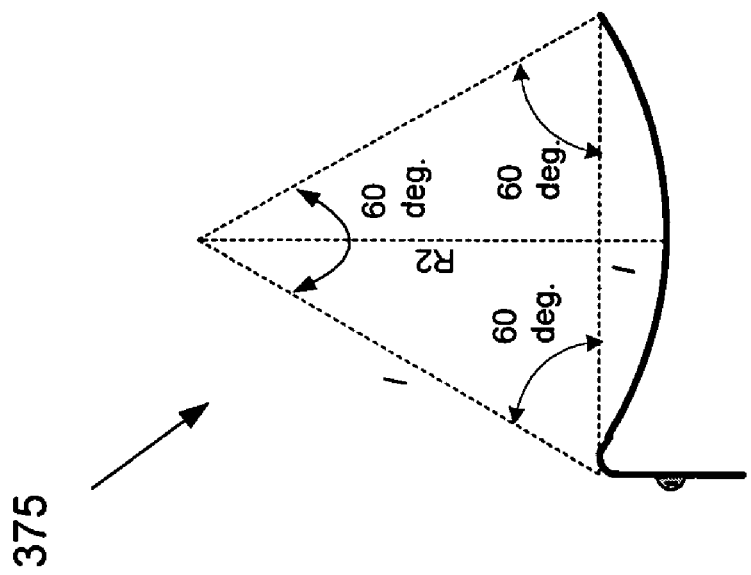
Figure 5A:
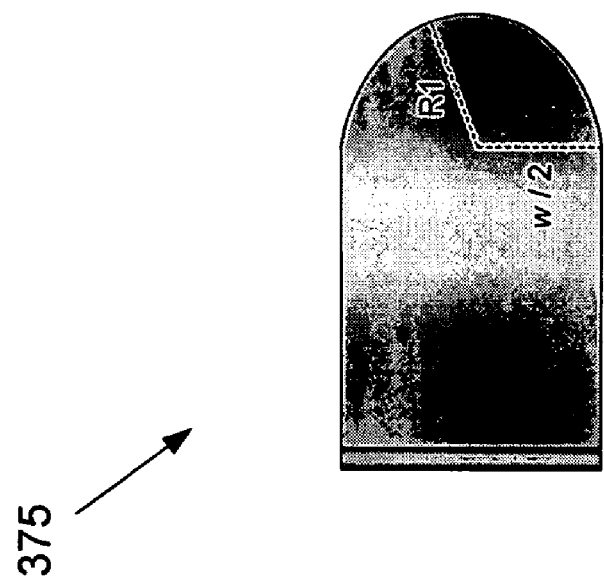
FIG. 5a is a top view drawing showing an embodiment of a paddle.

With principal reference to FIGS. 5a and 5b, the preferred embodiment of paddles 375 will now be discussed. From a top view, FIG. 5a shows that the curvature of the paddle end is in relation to the width w of paddle 375, with radius R1 preferably equal to half the width w of paddle 375. From a front side view, FIG. 5b shows that the curvature of the paddle length is proportionate to the linear segment l from one end to another of paddle 375. The radius of curvature R2 is preferably defined by measuring the distance from the farthest point of an equilateral triangle having linear segment l as one of the triangle's sides. In preferred embodiments, the radius of curvature is thus equal to linear segment l.

The structural geometry of any given paddle 375 is carefully designed to maximize the amount of air between the pigment particles as paddle 375 dispenses the pigment particles. During rotation of the inner cylindrical surface (e.g. during rotation of hollow vessel 335), paddles 375 will scoop the pigment particles and then, as rotation continues, dispense the pigment particles as the angle of paddles 375 increases with respect to the ground. As rotation of hollow vessel 335 occurs, the angle of paddle 375 with respect to the ground increases, and gravity begins to pull the pigment particles downward off paddle 375. The spoon-like geometry of paddle 375 takes advantage of the angle of repose associated with the pigment particles, causing more pigment particles to stay with paddle 375 for a longer time as the angle of paddle 375 with respect to the ground changes.

Paddles 375 and the inner cylindrical surface of hollow vessel 335 are preferably comprised of stainless steel so as not to contaminate the pigment pseudoparticles. A lesser grade material may be used such as steel, where iron contamination or contact is not of any meaningful consequence.

Figure 6:
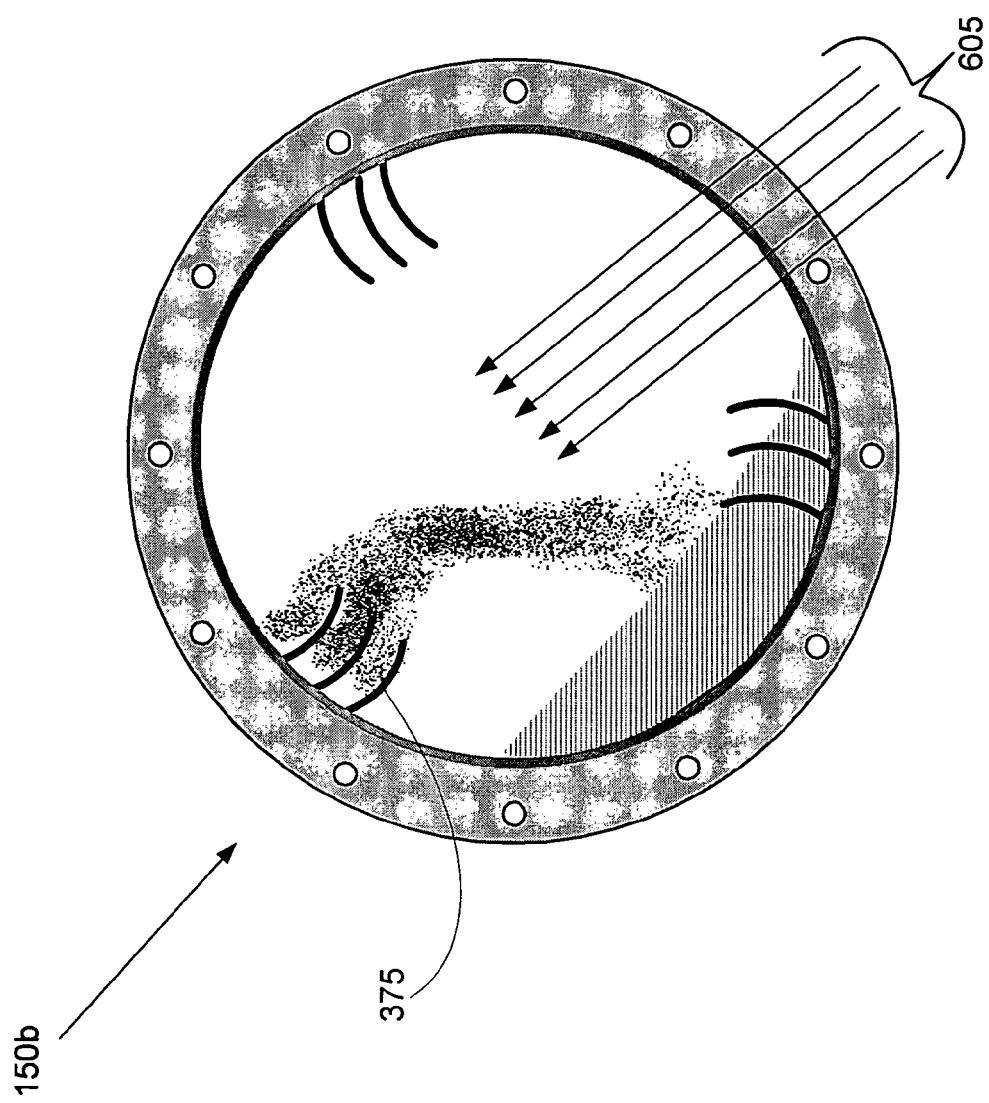
FIG. 6 is a cross-sectional front side view drawing showing an embodiment of a method utilizing the rotary cylinder agglomerator.

With principal reference to FIG. 6, preferred embodiments of methods utilizing rotary cylindrical agglomerator 150b will now be discussed. Pigment particles, preferably titanium dioxide are fed into hollow vessel 335 via feed inlet 360. In preferred embodiments, a natural draft 605 is also allowed to pass into hollow vessel 335 at or near feed inlet 360 and to exit via discharge ports 385. In preferred embodiments, the draft is created by the feeding of pigment particles into feed inlet 360 along with a flow of hot air. The pigment particles are urged forward by feed cone 360 and the incline of rotary cylinder agglomerator 150.

The pigment particles then undergo polarization and agglomeration inside hollow vessel 335, wherein a type of pigment particle movement is induced that is ideal for particle size enlargement. The pigment particles are lifted by paddles 375 and then dispensed into the gas (e.g. air) to cascade and coalesce. The pigment particles preferably pass through a natural draft 605 of air as the pigment particles cascade downward, thereby being cooled, and in some cases, thereby becoming charged. Draft 605 has the effect of lowering the temperature of the pigment particles. In some aspects, impact consolidation occurs when the particles land after falling through the gas.

The geometry of paddles 375 promotes the stochastic movement of pigment particles descending inside hollow vessel 335. As the pigment particles fall through the gas, the electron densities of the molecules in the pigment particles shift so as to create dipoles within the molecules and within the pigment particles. The presence of a dipole in each molecule induces heightened van der Waal attraction between the pigment particles. Embodiments of the present invention do not require that the pigment particles be sprayed with a binding agent or other chemical. Instead, embodiments of paddles 375 are preferably designed based on the angle of repose of the pigment particles. The curved end of paddle 375 enhances the distribution at the point of departure before the pigment particles descend. Furthermore, paddles 375 are installed on the inner cylindrical surface of hollow vessel 335 in substantially helical formation to provide, while rotating axially, a continuous uniform falling curtain of titanium dioxide or other pigment particles).

The geometry of paddles 375 increases the surface area and number of pigment particles that are directly exposed to the gas (e.g. air), thereby increasing the number of pigment particles that are polarized from the gas through which the pigment particles move. This is analogous to rain falling through the atmosphere, thereby enhancing the already present natural electrostatic attractions existing in the titanium dioxide or other pigment particles. The polarization of the molecular charge distributions ultimately causes particle coalescence.

The polarized pigment particles fall onto a pile of other pigment particles, including polarized pigment particles and/or yet-to-be-polarized pigment particles. This contact with the pile cushions impact and contributes to consolidation of the powder. As the inner cylindrical surface rotates, the pile climbs up the side of the inner cylindrical surface, ultimately falling upon itself. This avalanching and "snowballing" has the effect of agglomerating the polarized pigment particles to form smooth, substantially-spherically shaped pigment pseudoparticles using without any compression. Tumble growth, avalanching and/or snowballing is one the mechanism of the agglomeration. In tumble growth agglomeration, small particles move irregularly, and randomly collide in a material bed, which causes them to adhere to each other from attractive van der Waal forces exhibited by the pigment particles (especially when the particle size is less than 1 micron). Rotary cylinder agglomerator 150 is designed for this type of agglomeration and densification process.

Aspects of the structure of the pigment pseudoparticle also depends on several other factors, including the amount of deaeration affecting the density of the pile, the height imparted to the pile, the binding mechanism, the processing time, etc. The pile of pigment particles, which has been deaerated, such as in rotary cylinder agglomerator 150, produces a denser, less porous pigment pseudoparticle because particles that have attached themselves to the surface of other particles and are either torn off again or moved to another location on the surface in the contact section of the process. In some embodiments, once pigment pseudoparticle nuclei are formed, the pigment pseudoparticle continue to grow as additional pigment particles become attached again to the surfaces, thus continuing to form agglomerates In some embodiments, vibrations are applied to rotary cylinder agglomerator 150 to mitigate particle build-up on the internal parts. Particle build up on the walls is eliminated and further densification is accomplished by strikers 330 being actuated by rotating lifters 380, thereby imparting vibrational energy to cause any incipient build up to fall off, and causatively vibrate entrained air from the dry pigment.

The pigment pseudoparticles exit from discharge ports 385 of rotary cylinder agglomerator 150. The resulting pseudoparticles are preferably a +12 to +100 mesh size round smooth bead of insubstantial hardness and visually similar in comparison to table salt, or granulated sugar.

Preferred pigment pseudoparticles are characterized by the fact that the constituent pigment particles are bonded together primarily by an induced level of intermolecular electrostatic attractive force and that pigment pseudoparticle is substantially free of internal dust. Preferred embodiments of the pseudoparticle consist essentially of pigment particles bonded together by an induced level of intermolecular electrostatic attractive force, only a negligible amount of dust being present).

The bonding is preferably van der Waal bonding resulting from an at least temporary dipole-dipole condition in each pigment particle, induced by the presence of an electrostatically charged gas. Van der Waal bonds are typically produced when the electron configuration of the atoms in a molecule losses its symmetrical electron configuration. This polarizes molecules and entire pigment particles of molecules. More pigment particles are preferably polarized than the amount that might naturally occur. The pigment particles may strip electrons from the gas as the pigment particles fall through the gas, thereby charging the pigment particles.

The pigment pseudoparticles are preferably smoothly-discharging, low-dusting, of a higher bulk density and easily dispersible; there is only negligible amounts (if any at all) of rat holing, bridging, caking or solid compaction during storage. This is despite the fact that it is typical in the art that the constituent pigment particles of the pigment pseudoparticle would have been preliminarily subjected to micronizing, such as by grinding (e.g. grinding machine 110), by jet milling, sand milling, hammer milling, etc. Preferred embodiments of the pigment pseudoparticles are useful for coloring foodstuffs, cosmetics, detergents, paint and plastics, inks, elastomers, cement, fly ash, powdered foodstuffs, cement, cosmetics, polytetrafluoroethylene, powders, talc, clay and other suitable mediums to be pigmented.

Pigment pseudoparticles preferably have a greater bulk density (preferably about 20% greater) and lower bulk volume than the pigment particles, thereby reducing packaging requirements. In this respect, more pigment can be stored in a package using pigment pseudoparticles rather than powdered pigment particles, thereby providing cost savings, without the dispersion problems that are usually attendant to conventional pigment pellets. The pigment pseudoparticles preferably have a defined shape, and are particularly suitable for use with metering and feeding devices.

As discussed above, preferred embodiments of the pigment pseudoparticle consist essentially of pigment particles. Chemicals are not required to bind the pigment particles together. Thus, the final product (e.g. the pigment pseudoparticle) is preferably not a composite or other mixture of chemicals and does not possess the characteristic hardness and reduced dispersability common to chemically bound pigment pellet composites. Preferred pseudoparticles are smooth, round, homogenously agglomerated pigment having higher bulk density, reduced dust generation, high free flow ability and dispersibility. The round shape substantially increases the flowability and reduce or eliminate the generation of powder fines or dusts in processing and resists compaction, clumping and ageing in storage and shipment.

Preferred pigment pseudoparticles have minimal adhesion to one another after forming, primarily due to the round shape and the harnessing of van der Waal forces. Thus, when preferred pigment pseudoparticles arrive at their final size, there is no meaningful attractive force with other larger particles. Nevertheless, preferred pigment pseudoparticles retain the beneficial characteristics of extremely high friability and good dispersion, due to the absence of mechanical or chemical binding. The increased density also means that the pigment pseudoparticle, on an equal weight basis, utilizes less volume and less packaging, than a conventional unprocessed pigment, for example.

COMPARATIVE EXAMPLES

Certain test trials were conducted and comparative examples are articulated below showing the effectiveness of embodiments of the current invention. Flow was determined by measuring the drain time in seconds from a cylindrical hollow vessel (volume 50 or 100 gm) with a 60 deg. conical base through a defined bore (generally 10 mm). Dust values were assessed as a weight in comparison with the powder weight. The dust characteristics of a powder or pellet may be measured using a Heubach Dustmeter. The fine dust discharged from a rotating drum, through which an air stream flows at a defined rate, is determined gravimetrically on a glass fiber filter. By making measurements after differing exposure times, the dust generation profile may be plotted as a function of mechanical loading. The dust values are assessed as a weight in comparison with the powder. The visual observation of dust on transfer between containers is also used by way of comparison. Dispersion comparisons through a Brabender Extruder and into this polymer film are consistent with the unprocessed code standard pigment.

Comparative Example No. 1

100 parts by weight of finely ground red iron oxide pigment was mixed with the seed pigment of the same with 0.5 to 1.5 parts by total weight of propylene glycol. The mixture was placed in an embodiment of rotary cylinder agglomerator 150 and blended. The process was continued and within about 0.10-15 minutes complete pseudoparticle formation occurred, and a smoothly discharging product was obtained.

The increase in bulk density of the processed pigment was about 36%. The angle of repose decreased from 55.6 degrees to 41.6 degrees, a decrease of 25%. The increase in flow rate of the processed powder was from 0.8 grams/second to 5.0 grams/second. The 48-hour compression test of between 4 and 6 psi yielded a completely crumbled pigment discharge upon ejection from rotary cylinder agglomerator 150. The unprocessed pigment was a hard singular mass that did not even fracture upon ejection. The decrease in available dust was about 60%.

Comparative Example No. 2

100 parts by weight of finely ground, black iron oxide pigment was mixed with the seed pigment of the same with 0.5 to 1 parts by total weight of polydimethylsiloxane, 320 cs. The mixture was blended in an embodiment of rotary cylinder agglomerator 150. The process was continued and within about 0.25-15 minutes, pseudoparticle formation was complete, and a smoothly discharging product was obtained.

The increase in bulk density of the processed pigment was about 29%. The angle of repose was decreased from 55.6 degrees to 38 degrees, a decrease of 32%. The increase in flow rate of the processed powder was from 0.8 grams/second to 5.0 grams/second. The 48-hour compression test of between 4 and 6 psi yielded a completely crumbled, pigment discharge upon ejection from rotary cylinder agglomerator 150. The unprocessed pigment was a hard singular mass that did not even fracture upon ejection. The decrease in available dust was about 55%.

Comparative Example No. 3

100 parts by weight of a universal grade rutile titanium dioxide was blended, at temperature, in an embodiment of rotary cylinder agglomerator 150. The process was continued and within about 0.25-15 minutes pseudoparticle formation was complete, and a smoothly discharging product was obtained.

The increase in bulk density of the processed pigment was about 15%. The angle of repose decreased from 52 degrees to 38.6 degrees, a decrease of about 26%. The increase in flow rate of the processed pigment was from 1.6 grams/second to 6.2 grams/second. The 48-hour compression test of between 4 and 5 psi yielded a completely crumbled, pigment discharge upon ejection from the rotary cylinder agglomerator 150. The unprocessed pigment was a hard singular mass that did not even fracture upon ejection. The decrease in available dust was about 70% and paint dispersion comparisons on the Hegman scale were consistent with unprocessed code standard pigment.

Comparative Example No. 4

100 parts by weight of a hydrophobic plastics grade rutile titanium dioxide, at temperature, was blended in an embodiment of rotary cylinder agglomerator 150. The process was continued and within about 0.1-15 minutes pseudoparticle formation was complete, and a smoothly discharging product was obtained.

The increase in bulk density of the processed pigment was about 16%. The angle of repose decreased from 50.5 degrees to 38.3 degrees, a decrease of about 27%. The increase in flow rate of the processed pigment was from 1.9 grams/second to 8.3 grams/second. The 48-hour compression test of between 4 and 5 psi yielded a completely crumbled, pigment discharge upon ejection from the rotary cylinder agglomerator 150. The unprocessed pigment was a hard singular mass that did not fracture upon ejection. The decrease in available dust was about 80%.

In accordance with preferred embodiments of the invention, a smoothly discharging pigment pseudoparticle consists of spherical faux particles, the pigment pseudoparticle preferably being at least about 90% pigment particles by weight and up to 99.9+% pigment particles by weight. The pseudoparticles are preferably used for the pigmentation of aqueous and/or nonaqueous systems where requirements are low dust, good material flow and accurate metering or feeding properties.

Titanium dioxide particles are the preferred pigment particles. Titanium dioxide particles that can undergo the described process to provide the pseudoparticles, include by way of example and without limitation, any white or colored, opacifying or non-opacifying particulate pigments (or mineral pigments) suitable for the surface coatings (e.g. paint) and/or plastics industries. Titanium dioxide pigment for use in the process of this invention can be either the anatase or rutile crystalline structure or a combination thereof. The pigment may be produced by known commercial processes which are familiar to those of skill in this art but which those processes do not form any part of the present invention. Either the well-known sulfate process or the well-known vapor phase oxidation of titanium tetrachloride process can produce the specific pigment.

Titanium dioxide particles are particularly desired due to the fact that the molecules are extremely cohesive due to high electrostatic charges, the bipolar tendencies of the particle and the high van der Wall forces that are present from the extremely small particle size. These titanium dioxide particles can include anatase and rutile crystalline forms. In addition to utilizing titanium dioxide particles, other pigment particles can be utilized as well, preferably other inorganic oxide pigments such as alumina, magnesia, and zirconia. In some embodiments, pigment particles are preferably less than about one micron in average diameter and, in some embodiments, pigment particles and/or seed particles have average particle sizes of about 0.01 to about 5.0 microns. In some embodiments, the pseudoparticles preferably are spherical agglomerates about 0.01 millimeters in diameter, and in other embodiments, the pseudoparticles are preferably about 0.1 millimeters to about 4 millimeters in diameter.

Embodiments of rotary cylinder agglomerator 150 are specifically designed and optimized for the continuous processing of titanium dioxide particles and other pigment particles to include, by way of nonlimiting example, white opacifying pigments such as, basic carbonate white lead, basic sulfate white lead, basic silicate white lead, zinc sulfide, zinc oxide, composite pigments of zinc sulfide and barium sulfate, antimony oxide and the like, white extender pigments such as calcium carbonate, calcium sulfate, china and kaolin clays, mica, diatomaceous earth and colored pigments such as iron oxide, lead oxide, cadmium sulfide, cadmium selenide, lead chromate, zinc chromate, nickel titanate, chromium oxide, etc.

In some embodiments, the pigment particles may be treated or coated by adding a standard surface treatment to the pigment pseudoparticle. In some embodiments, the surface of the pseudoparticle is post-treated with, for example, one or more oxides or hydroxides of metals. This includes, by way of nonlimiting example, aluminum, antimony, beryllium, cerium, hafnium, lead, magnesium, niobium, silicon, tantalum, titanium, tin, zinc, and/or zirconium. The pigments of titania or other inorganic oxides can contain aluminum, introduced by any suitable method, including co-oxidation of halides of titanium (or other metal) and aluminum as in a chloride process or the addition of aluminum compounds before calcination in a sulphate process.

Although there has been hereinabove described an apparatus and method of forming pigment pseudoparticles, in accordance with the present invention, for the purposes of illustrating the manner in which the invention may be used to advantage, it should be appreciated that the invention is not limited thereto. Accordingly, any and all modifications, variations, or equivalent arrangements which may occur to one skilled in the art should be considered to be within the scope of the present invention as defined in the appended claims.

What is claimed is:

1. A method of forming pigment pseudoparticles from pigment particles, comprising: rotating in a direction a hollow vessel having a plurality of inwardly extending paddles with concave segments, thereby lifting pigment particles contained within the hollow vessel; rotating the hollow vessel in the direction of rotation to dispense the lifted pigment particles into a gas, thereby polarizing the pigment particles with the gas inside the hollow vessel; and rotating the hollow vessel in the direction to avalanche the polarized pigment particles, thereby agglomerating the polarized pigment particles to form electrostatically-bound pigment pseudoparticles substantially free of binding agents.

2. The method of claim 1, wherein rotating the hollow vessel in the direction of rotation to dispense the lifted pigment particles into the gas, thereby polarizing the pigment particles with the gas, comprises dispersing the pigment particles in the gas.

3. The method of claim 1, wherein rotating the hollow vessel in the direction of rotation to dispense the lifted pigment particles into the gas, thereby polarizing the pigment particles with the gas, comprises inducing an at least temporary dipole in each of the pigment particles.

4. The method of claim 1, wherein rotating the hollow vessel in the direction of rotation to dispense the lifted pigment particles into the gas, thereby polarizing the pigment particles with the gas, comprises polarizing enough molecules of each of the pigment particles to induce heightened van der Waal bonding between the pigment particles.

5. The method of claim 4, wherein rotating the hollow vessel in the direction of rotation to dispense the lifted pigment particles into the gas, thereby polarizing the pigment particles with the gas, comprises polarizing less than all molecules of the pigment particles.

6. The method of claim 1, comprising charging at least a portion of the pigment particles with the gas.

7. The method of claim 1, comprising passing the pigment particles through the gas.

8. The method of claim 7, wherein passing comprises providing a draft of air passing through the pigment particles.

9. The method of claim 7, comprising carrying away excess heat in the gas.

10. The method of claim 7, comprising carrying away no more than a negligible amount of pigment particles in the gas.

11. The method of claim 1, wherein rotating the hollow vessel in the direction of rotation to dispense the lifted pigment particles into the gas, thereby polarizing the pigment particles with the gas, comprises rotating the hollow vessel so as to deposit a portion of the polarized pigment particles upon a pile of the polarized pigment particles having an angle of inclination greater than the angle of repose of the pile.

12. The method of claim 1, wherein rotating the hollow vessel to avalanche the polarized pigment particles, thereby agglomerating the pigment particles, comprises rotating the hollow vessel to agglomerate the polarized pigment particles into substantially-spherically shaped pigment pseudoparticles.

13. The method of claim 1, wherein rotating the hollow vessel to avalanche the polarized pigment particles, thereby agglomerating the pigment particles, comprises rotating the hollow vessel to agglomerate the polarized pigment particles into substantially-spherically shaped pigment pseudoparticles each having a diameter between about 0.1 millimeter and about 5.0 millimeters.

14. The method of claim 1, wherein rotating the hollow vessel to avalanche the polarized pigment particles, thereby agglomerating the pigment particles, comprises rotating the hollow vessel to nucleate.

15. The method of claim 1, comprising deaerating the pigment particles.

16. The method of claim 1, comprising vibrating an inlet feed of the hollow vessel to deserate the pigment particles.

17. The method of claim 16, wherein vibrating comprises vibrating the inlet feed at a frequency of vibration between about sixty vibrations per minute and about twenty-thousand vibrations per minute.

18. The method of claim 1, comprising vibrating the hollow vessel to mitigate adhesion between an inner cylindrical surface of the hollow vessel and at least one of the pigment particles and the polarized pigment particles.

19. The method of claim 1, wherein the method is conducted under an electrically isolated condition.

20. The method of claim 1, wherein the method is conducted at temperatures between about 0 degrees Celsius and about 100 degrees Celsius.

21. The method of claim 1, wherein the method is conducted for a duration of time between about 0.25 minutes and about 15 minutes.

22. The method of claim 1, comprising post-treating the pigment pseudoparticles.

23. The method of claim 22, wherein post-treating comprises applying a layer of chemical additive to a surface of at least one of the pigment pseudoparticles.

24. The pigment pseudoparticles produced in accordance with the method of claim 1.

25. Paint formulation comprising the pigment pseudoparticles produced in accordance with the method of claim 1.

26. Masterbatch comprising the pigment pseudoparticles produced according to the method of claim 1.

27. A method of forming pigment pseudoparticles from titanium dioxide particles, comprising: providing a hollow vessel having an inner cylindrical surface and containing pigment particles; providing a plurality of paddles that extend inwardly from the inner cylindrical surface and that each have a concave segment; passing a flow of gas through the inner cylindrical surface; axially rotating the inner cylindrical surface, thereby causing the plurality of paddles to lift a portion of the pigment particles; axially rotating the inner cylindrical surface, thereby causing the plurality of paddles to dispense the pigment particles such that the dispensed particles become polarized by the gas and land onto a pile of the pigment particles; and axially rotating the inner cylindrical surface, thereby inducing a repeated avalanching of the polarized pigment particles that agglomerates the polarized pigment particles into electrostatically-bound pigment pseudoparticles substantially free of binding agents.

28. The method of claim 27, wherein providing the plurality of paddies comprises providing the plurality of paddles positioned along the inner cylindrical surface in a substantially helical formation.

29. The method of claim 27, comprising vibrating an inlet feed of the hollow vessel to deaerate the pigment particles.

30. The pigment pseudoparticles produced in accordance with the method of claim 27.

31. A method of forming pigment pseudoparticles from pigment particles, comprising: providing an inclined hollow vessel having an inner cylindrical surface, a higher inlet end and a lower outlet end; providing a plurality of paddies (1) extending inwardly from the inner cylindrical inner surface, (2) positioned along the axial length of the inclined hollow vessel in a helical formation, and (3) having concave segments; introducing the pigment particles into the inclined hollow vessel at the higher inlet end; passing a flow of gas through the inclined hollow vessel in a direction toward the lower outlet end; lifting the pigment particle with the paddles by axially rotating the inner cylindrical surface; dispensing the pigment particles from the paddles by axially rotating the inner cylindrical surface, thereby allowing the pigment particles to fall through the flow towards the inner cylindrical surface while being polarized by the gas; and nucleating the polarized pigment particles into electrostatically-bound pigment pseudoparticles by axially rotating the inner cylindrical surface.

32. The pigment pseudoparticles produced in accordance with the method of claim 31.

33. An apparatus for forming electrostatically-bound pigment pseudoparticles from pigment particles, comprising: a hollow vessel comprising an inner cylindrical surface, an inlet end, and an outlet end, wherein the hollow vessel is configured for rotation and adapted to be positioned at an incline having the inlet end higher and the outlet end lower; a gas within the hollow vessel; and a plurality of paddies extending inwardly from the inner cylindrical surface and positioned along the axial length of the inner cylindrical surface, each of said paddles (1) being configured to, in response to rotation of said hollow vessel, lift and dispense pigment particles so as to form electrostatically-bound pigment pseudoparticles, and (2) including a concave segment.

34. The apparatus of claim 33, wherein the gas comprises a draft of air flowing in a direction from the inlet end towards the outlet end.

35. The apparatus of claim 33, comprising vibrating means for deaerating the pigment particles.

36. The apparatus of claim 33, wherein each of the plurality of paddles comprise an attachment end attached to the inner cylindrical surface, a dispenser end distal the attachment end, and the concave segment therebetween, wherein the concave segment has concave curvature facing the direction of rotation.

37. The apparatus of claim 36, wherein the attachment end is at least one of being directly attached to the inner cylindrical surface and being attached to the inner cylindrical surface via an intermediate component.

38. The apparatus of claim 33, wherein the hollow vessel is modular.

39. The apparatus of claim 33, comprising means for supporting the hollow vessel during rotation.

40. The apparatus of claim 39, wherein the means for supporting the hollow vessel comprises trunnions.

41. The apparatus of claim 33, wherein each of the plurality of paddles are spoon-shaped.

42. The apparatus of claim 36, wherein a radius of curvature of the segment is substantially equal to a linear distance measured from the attachment end to the dispenser end.

43. The apparatus of claim 42, wherein the dispenser end comprises convex curvature having a radius of curvature substantially equal to half the width of the segment.

44. The apparatus of claim 33, comprising means for deaerating the pigment particles.

45. The apparatus of claim 33, comprising means for minimizing adhesion between the inner cylindrical surface and at least one of the pigment particles and the polarized pigment particles.

46. The apparatus of claim 45, wherein the means for minimizing adhesion comprises strikers adapted to strike the hollow vessel thereby causing the hollow vessel to vibrate.

47. The apparatus of claim 46, comprising means for periodically actuating the strikers in association with rotation of the hollow vessel.

48. The apparatus of claim 33, wherein the hollow vessel is positioned at an angle with respect to the ground.

49. The apparatus of claim 48, wherein the angle is no more than about twenty degrees.

50. The apparatus of claim 48, wherein the angle is greater than about zero degrees and wherein the angle is less than about ten degrees.

51. The apparatus of claim 36, wherein the attachment ends of the plurality of paddles are positioned along the inner cylindrical surface in a substantially helical formation.

52. The apparatus of claim 36, wherein the plurality of paddles comprise at least one set of paddles, the attachment ends of each paddle in a set being positioned along the inner cylindrical surface in a substantially helical formation.

53. The apparatus of claim 36, wherein the plurality of paddles comprises a first set of paddles, a second set of paddles and a third set of paddles, wherein the attachment ends of each paddle in the first set are positioned along the inner cylindrical surface in a first substantially helical formation, wherein the attachment ends of each paddle in the second set are positioned along the inner cylindrical surface in a second substantially helical formation, and wherein the attachment ends of each paddle in the third set are positioned along the inner cylindrical surface in a third substantially helical formation.

* * * * *